July 21, 1936.  E. H. DREHER  2,048,541
CALCULATING MACHINE
Filed Jan. 14, 1924    7 Sheets-Sheet 1

Fig. 1

INVENTOR.
Elmer H. Dreher,
BY Rippey Kingsland,
HIS ATTORNEYS.

July 21, 1936.  E. H. DREHER  2,048,541
CALCULATING MACHINE
Filed Jan. 14, 1924   7 Sheets-Sheet 3

INVENTOR.
Elmer H. Dreher,
BY Rippey Kingsland,
HIS ATTORNEYS.

July 21, 1936.    E. H. DREHER    2,048,541
CALCULATING MACHINE
Filed Jan. 14, 1924    7 Sheets-Sheet 4

INVENTOR.
Elmer H. Dreher,
BY
HIS ATTORNEYS.

July 21, 1936.　　　E. H. DREHER　　　2,048,541
CALCULATING MACHINE
Filed Jan. 14, 1924　　　7 Sheets-Sheet 7

INVENTOR.
Elmer H. Dreher,
BY
HIS ATTORNEYS.

Patented July 21, 1936

2,048,541

UNITED STATES PATENT OFFICE 2,048,541

CALCULATING MACHINE

Elmer H. Dreher, Norwood, Ohio, assignor, by mesne assignments, to Remington Rand Inc., New York, N. Y., a corporation of Delaware Application January 14, 1924, Serial No. 686,036

57 Claims. (Cl. 235—60)

This invention relates to calculating machines.

An object of the invention is to provide an improved calculating machine having a calculating device operable for the performance of addition or subtraction as desired, and means for controlling the operation of the calculating device.

Another object of the invention is to provide a calculating machine having improved means for introducing the required additional unit or fugitive 1 into the counting pinion in units denominational order automatically and as an incident to operation of the machine in work of subtraction by the direct method.

Another object of the invention is to provide mechanism optionally controllable by the shift of the paper carriage from one columnar position to another for conditioning the machine to introduce into the counting pinion in units denominational order the additional unit or fugitive 1 whereby the work will be accurately performed by a usual cycle of operation of the machine after being conditioned as aforesaid.

Another object of the invention is to provide an improved calculating device for the machine whereby examples of addition or examples of direct subtraction may be performed, in combination with means for signaling to the operator that a negative total is contained in the machine when the operator attempts to perform certain other operations of the machine.

Various other objects will appear from the following description, reference being made to the drawings in which—

The machine in which I have shown the present invention embodied is a Dalton adding machine comprising a laterally movable differential carriage 1 into which numbers are set up by the operation of the numeral key levers 2. Racks 3 are limited in their forward movements by the differential stops in the carriage 1 and the numbers may be printed upon paper passing around a paper roll 4 in a laterally shiftable carriage 5. The printing is performed by type 6 on carriers 7, the type being driven in printing operations by hammers 8. The racks and the type-carriers 7 are pivotally supported upon a shaft 9. The type-carriers have rearwardly extended arms 10 and are normally held in their idle positions by a rod 11 which is moved downwardly and forwardly when it is desired to operate the type-carriers. The movement of the rod 11 is incidental to the forward and back turning movements of a shaft 12. The racks 3 operate the usual adding pinions 13.

The machine contains the usual total key 14 and subtotal key 15 for their familiar purposes.

The present invention is arranged to cooperate with the above described familiar mechanism of the Dalton adding machine. A number of sliding actuators 16 are guided in their movements by rods 17. The slides 16 are connected with the arms 10 on the type-carriers 7, respectively, by links 18 so that the type-carriers and slides operate in unison. Springs 19 connected at one end to the slides 16 and to a stationary part at the other end actuate the slides downwardly and the type-carriers forwardly during the forward turning movement of the shaft 12 as an incident to which there is a forward and downward movement of the rod 11.

In the machine shown there are three special calculating devices in addition to the usual adding mechanism 13. Each sliding actuator 16 supports three rack plates 20 by a pin and slot connection 21 which permits transferring movements of the rack plates 20 independently of the supporting sliding actuators 16. Springs 22 actuate the rack plates 20 in transfering operations. Each of the rack plates 20 is formed with a rack 23 with which pinions 24 are in constant mesh. The pinions 24 of each calculating device are independently rotative on the shaft 25 which extends transversely through slots 26 in the plates 20.

Figure 7:
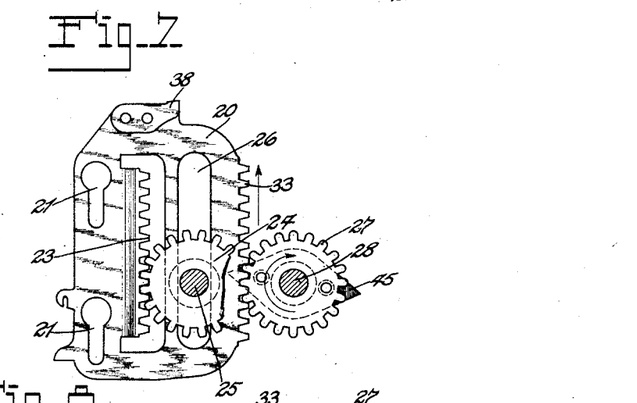
Fig. 7 is a side elevation of the same parts shown in Fig. 5 adapted for the performance of examples of addition.
Figure 8:
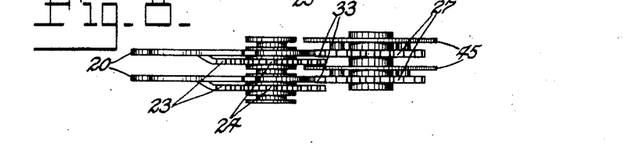
Fig. 8 is a plan view of the parts in position for addition.
Figure 14:
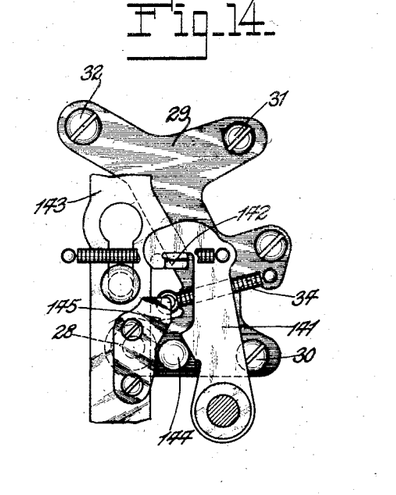
Fig. 14 illustrates the device for holding the counter pinions in mesh with their actuators when taking a total or a subtotal.

The counting pinions 27 of each special calculating device are independently rotative on a shaft 28. The shaft 28 is supported in a swinging frame comprising a pair of side members 29 (Figs. 1 and 14) rigidly connected at their lower ends by rods 30 and at their upper ends by rods 31 and pivotally supported at their upper ends by a rod 32. Each of the rack plates 20 has a rack 33 thereon. The racks 33 are in lateral alinement with the rear sides of the pinions 24 which are diametrically opposite from the racks 23 with which the pinions 24 mesh. The shaft 28 is axially movable to shift the pinions 27 out of engagement with the racks 33 to engagement with the pinions 24, and vice versa. In work of straight addition the pinions 27 are in engagement with the racks 33 (Fig. 8) and in work of subtraction the pinions 27 are in engagement with the pinions 24 (Fig. 6), the direction of rotation of the pinions 27 in adding and subtracting being indicated by the arrows in Figs. 7 and 5, respectively.

The swinging frame in which the shaft 28 is supported is actuated by a spring 34 (Figs. 1 and 14) in a direction to mesh the pinions 27 with the pinions 24 or the racks 33. In addition the pinions 27 are held in mesh with the racks 33; and in substraction the pinions 27 are held in mesh with the pinions 24 for operation thereby. When the pinions 27 are out of mesh they are locked from rotation by a bar 35 (Fig. 1) supported independently of the swinging frame in which the pinions are mounted.

Figure 3:
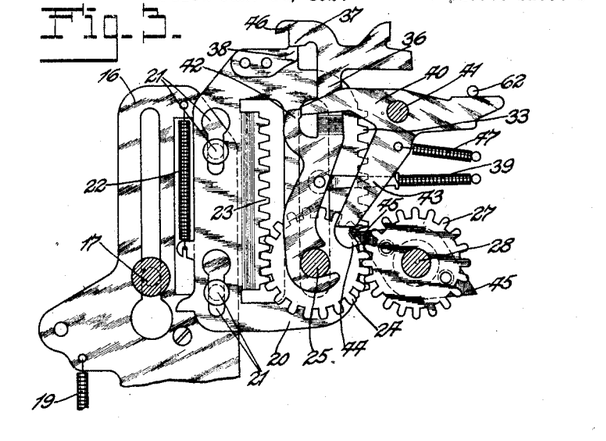
Fig. 3 is an enlarged side elevation of one of the calculating devices in normal or clear position after a positive total has been printed.
Figure 4:
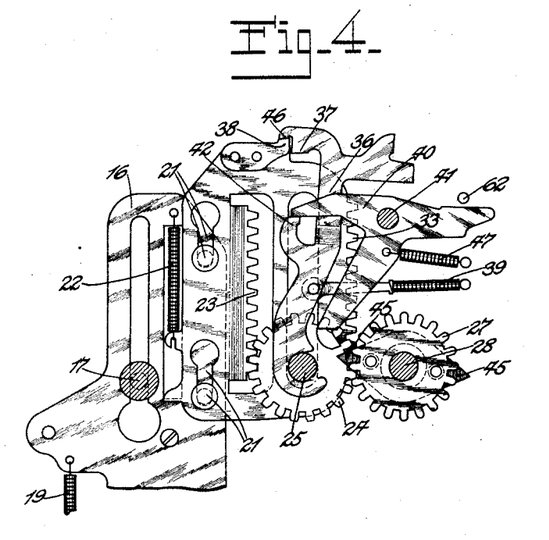
Fig. 4 is a side elevation of the same calculating device with the parts shown in a transfer position during a subtraction operation.
Figure 5:
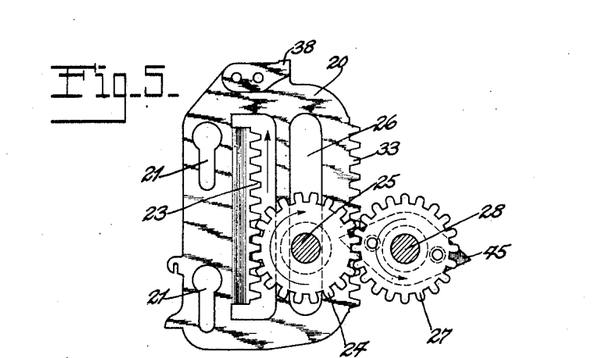
Fig. 5 is a side elevation of the calculating pinions and their actuating racks in a position for the performance of subtraction.
Figure 6:
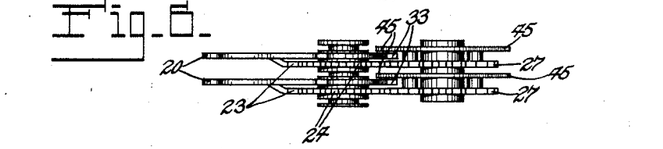
Fig. 6 is a plan view of the parts in the position for subtraction.

In normal or clear position the parts occupy the adjustment shown in Fig. 3. Detents 36 are pivoted on the shaft 25, one for each of the rack plates 20 and have shoulders 37 that are engaged by projections 38 on the rack plates. Springs 39 tend to disengage the shoulders 37 from the projections 38. A series of latch arms 40 are pivoted on a shaft 41 and engage fingers 42 on the detents 36 and thereby hold the detents 36 in position in which the shoulders 37 are engaged by the projections 38 until a transfer operation from a lower to a higher order occurs. Each of the latch arms 40 has an arm 43 extending downwardly and terminating near the pinions 27, the arms 43 having wedge-shaped extremities 44 which are engaged by trip cams 45 attached to the respective pinions 27. The construction is such that the trip cams 45 will cooperate with the parts 44 when the pinions 27 are in engagement with either the racks 33 or the pinions 24. In the construction shown each of the pinions 27 comprises twenty teeth, so that in making a complete revolution it is necessary to make two transfer operations. Therefore, there are two trip cams 45 for each pinion 27, said trip cams being diametrically opposite and comprising pointed extremities of a plate attached to the corresponding pinion 27 (Figs. 5 and 6). Therefore in turning from the position shown in Fig. 3 to the position shown in Fig. 4 or vice versa the trip cam 45, adjacent to the part 44, operates the arm 40 and releases the end thereof from the finger 42 permitting the spring 39 to move the detent 36 to the position shown in Fig. 4 in which the shoulder 37 is disengaged from the projection 38 and an extension 46 on the detent 36 engages the projection 38. This permits the spring 22 to impart a transfer movement to the rack plate 20 introducing an additional unit positively or negatively into the counting pinion 27 that is entrained with the rack plate making the transfer movement. Springs 47 actuate the latch arms 40 to latching positions.

Figure 1:
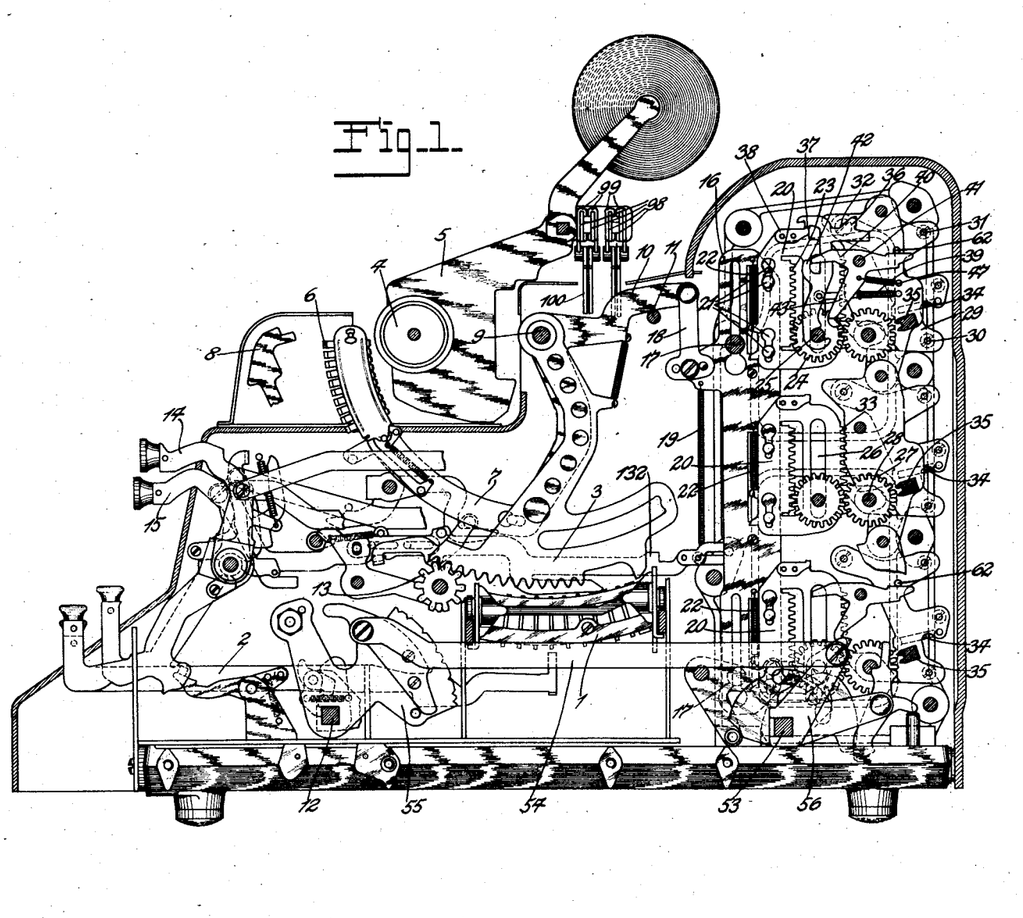
Fig. 1 is a side elevation of the mechanism comprising the present invention, certain of the parts being in section and others broken away.
Figure 15:
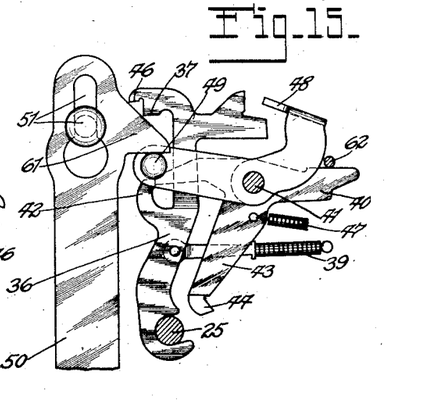
Fig. 15 illustrates the devices for restoring the transfer elements to their normal position for operation.
Figure 16:
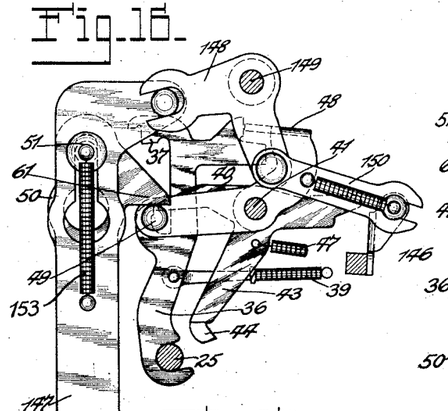
Fig. 16 is a view illustrating the transfer elements after they have been restored to normal position and certain parts for locking the transfer mechanism.
Figure 17:
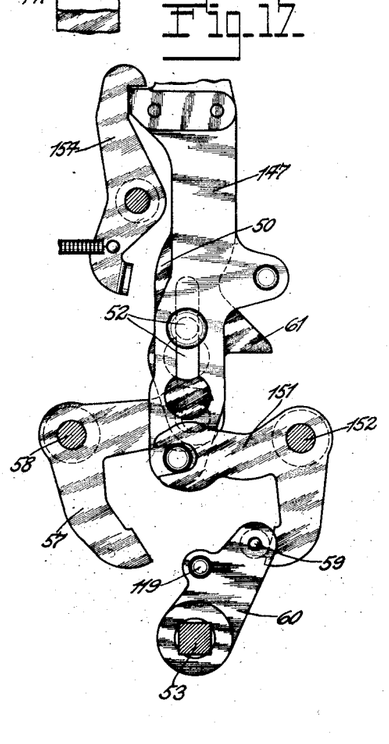
Fig. 17 is a detailed view of the devices controlling the operation of the lock for locking the transfer mechanism, the link 147 of Fig. 16 being a continuation of the link 147 of Fig. 17.

After each transferring operation it is necessary to restore the rack plate 20 to its lower adjustment (Fig. 3) and restore the detent 36 into position in which the shoulder 37 engages the projection 38 and in which the latch 40 engages the finger 42. A bail 48 (Figs. 15 and 16) is supported on the shaft 41 and has an extended arm provided with a laterally extending lug 49. A link 50 is guided at its upper end by a stud and slot arrangement 51 (Fig. 15) and at its lower end by a similar stud and slot arrangement 52 (Fig. 17). A shaft 53 is rocked with the shaft 12 by a connection comprising a link 54 having its forward end connected to a part 55 on the shaft 12 and its rear end connected to an arm 56 on the shaft 53 (Fig. 1). A bell crank lever 57 (Fig. 17) pivoted on a support 58 has one arm pivoted to the lower end of the link 50 and the opposite arm in the line of movement of a roller 59 carried at the side of an arm 60 attached to the shaft 53. Near the end of the forward turning movement of the shaft 53 the roller 59 engages and operates the bell crank lever 57 drawing the link 50 downwardly. The link 50 has a projection 61 for the bail 48 of each special calculating device. The projection 61 engage the lugs 49 during downward movement of the link 50 which occurs near the end of the forward turning movement of the shaft 53, thereby swinging the bails 48 forwardly against adjacent portions of the detents 36 and pushing the detents 36 to place the shoulders 37 above the projections 38. This is possible because the slides 16 have moved the rack plates 20 downwardly a sufficient distance, while the pinions 27 are disengaged from the pinions 24 and from the racks 33. This permits the latches 40 that had been operated in transferring to move behind the fingers 42 of the detents 36, movement of the latches 40 by the springs 47 being limited by rods 62. The transfer devices are thus restored to their normal positions whether the transferring was in addition or in subtraction.

The mechanism for swinging the pinions 27 into and out of engagement with the pinions 24 for subtraction and into and out of engagement with the racks 33 for addition is not claimed as a part of the present invention and is therefore not described. It is sufficient to understand that on the return stroke the pinions 27 mesh with the pinions 24 in performing subtraction and with the racks 33 in performing addition, and are out of mesh on the forward stroke. A suitable mechanism for swinging the pinions 27 into and out of engagement with the pinions 24 and the racks 33 is disclosed in and comprises a part of the subject matter of the application of Walter W. Landsiedel, filed January 14, 1924, Serial No. 686,023, patented November 15, 1923, No. 1,649,478.

I will now describe the mechanism for shifting the pinions 27 from the pinions 24 to the racks 33, and vice versa.

A key lever 63 (Fig. 9) is pivoted on a shaft 64 and is normally in the raised position shown. When depressed the projection 65 on the key lever engages a shouldered latch 66 actuated by a spring 67 and released on the return stroke of the shaft 12 by a wipe pawl 68 supported by the shaft 12. The upper end of the key lever 63 is pivoted to the forward end of a link 69, the rear end of which has a slot 70 through which a pivot pin 71 passes forming a pivotal connection with the upper arm of a bell crank lever 72 on a support 73. The other arm of the bell crank lever 72 is operatively connected with the upper end of a sliding member 74 having a finger 75 on its lower end extending under a pin 76 in a vertically sliding member 77. The member 77 is supported for vertical sliding movements on a horizontal slide 78 by pin in slot connection 79. The horizontal slide 78 is supported by pin in slot construction 80 at its rear end and by similar construction 81 at its forward end. A tridental lever comprising an upper arm 82, a lower arm 83 and a rear arm 84 is pivoted on the pin 81 and has a pin 85 on the arm 82 and a similar pin 86 on the arm 83. The arm 84 operatively engages a projection 87 on a vertically sliding link 88, which is normally in its upper position. When the key lever 63 is depressed the connections operated thereby raise the slide 77 until the extension 89 on the lower end of said slide is in line with the pin 86, taking the extension 90 at the upper end of the slide out of line with the pin 85. The slide 78 is connected with the rear end of a link 90ª, the forward end of which is connected with a part 91 on the main shaft 12. The slide 77 being raised, when the main shaft 12 is turned forwardly, the extension 89 of the slide 77 engages the pin 86 operating the tridental lever and causing the arm 87 to move the slide 88 downwardly.

Figure 2:
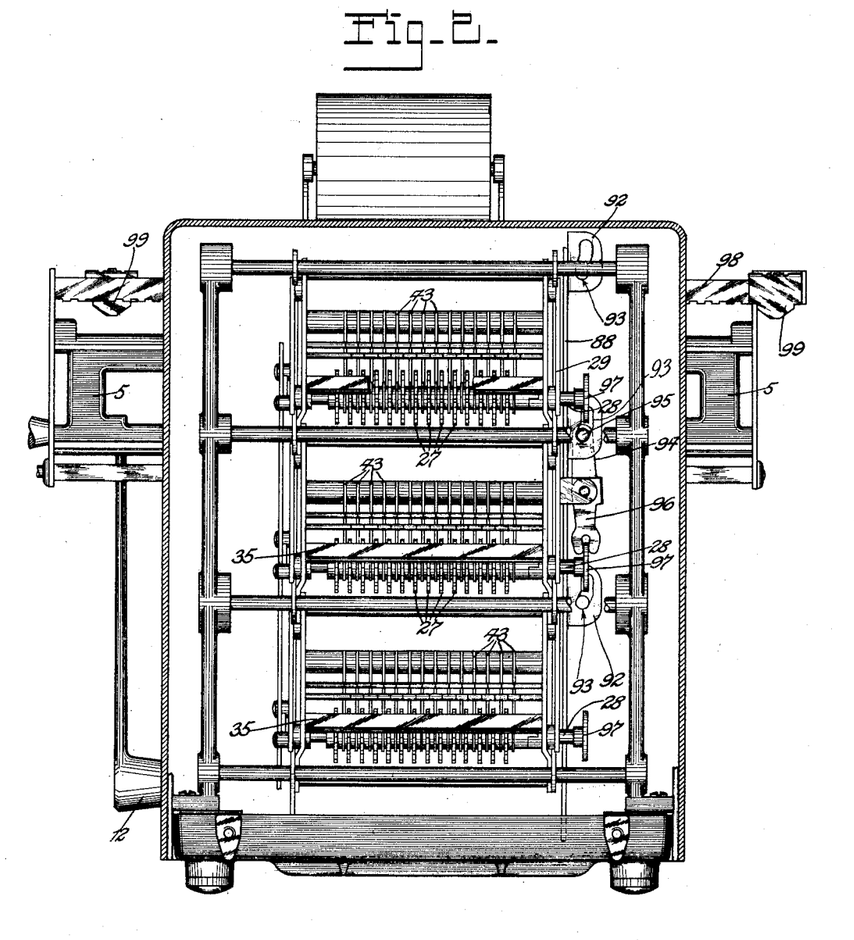
Fig. 2 is a rear end elevation with the enclosing case in section.
Figure 9:
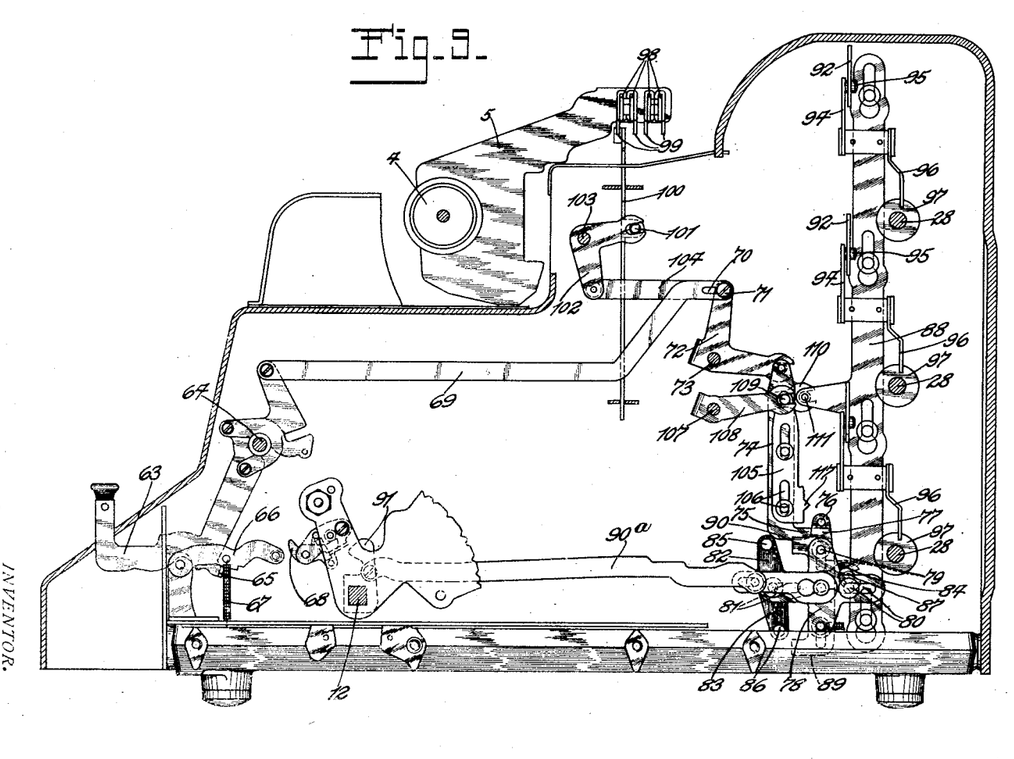
Fig. 9 is a detailed side elevation of the connections from the subtraction key lever and also the connections controlled by the paper carriage for controlling operation of the calculating devices.

For each special calculating device the slide 88 has a lateral extension 92 provided with a cam slot 93 (Figs. 2 and 9). Levers 94 have rolls 95 engaging in the slots 93 and have offset extensions 96 operatively engaging discs 97 on the respective pinion shafts 28. By this construction the downward movement of the link 88 shifts all of the pinion shafts 28 to place all of the pinions 27 in line with the corresponding pinions 24. When the key lever 63 is released the parts immediately controlled thereby and including the slide 78 are permitted to return to normal position. The pinions 27 will be shifted to engagement with the racks 33 on the next forward turning movement of the shaft 12, the extension 90 (Fig. 9) operating the tridental lever to raise the link 88 which, through the connections described, moves the shafts 28 axially thereby moving the pinions 27.

The paper carriage 5 also controls the operation of the pinions 27 for subtraction and addition. A number of bars 98 in the paper carriage 5 support cam 99 (Figs. 1, 2 and 9). The cams 99 are adjustable along the bars 98. One of the cams 99 is arranged to operate to depress a normally raised slide 100 (Fig. 9) having operative connection 101 with one arm of a bell crank lever 102 pivoted on a support 103. The opposite arm of the bell crank lever is connected by a link 104 with the upper arm of the bell crank lever 72 by a connection similar to that uniting the link 69 with the bell crank lever 72. Thus automatically and as an incident to the movement of the paper carriage to a selected columnar position the shift mechanism is conditioned for shifting the pinions 27 when the machine is operated as previously described; or, the shift mechanism for the pinions 27 may be conditioned manually by the key connections described irrespective of the position of the paper carriage.

Figures 10, 12:
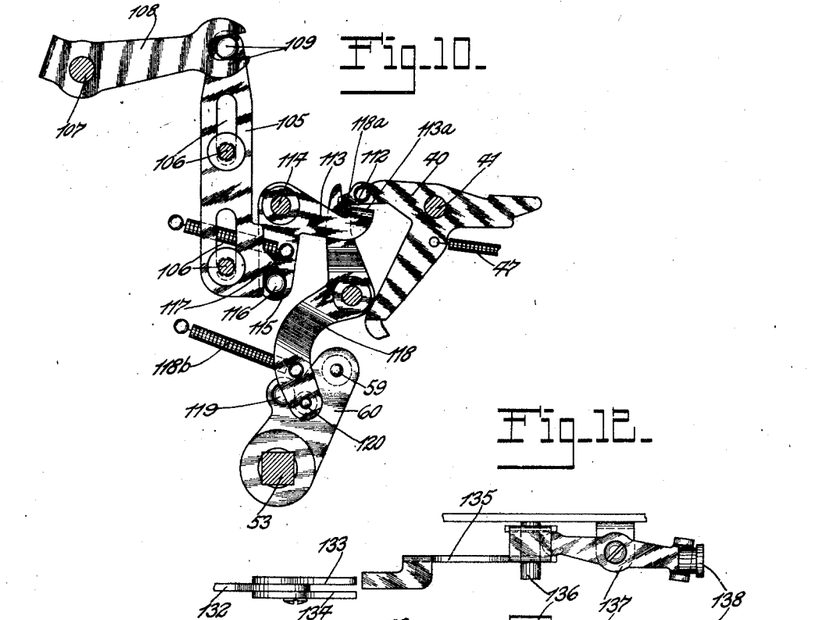
Fig. 10 is a detailed view of a part of the devices utilized for introducing a unit in units denominational order in the calculating devices in examples of subtraction.
Fig. 12 is a plan view of the upper portion of the devices shown in Fig. 11 which prevent operation of the total key and the subtotal key when the totalizer is not positioned according to the sign of its accumulation.

I will now describe the mechanism for obtaining a correct "negative total" from the lowermost special calculating device. By the term "negative total" I mean the result or deficit obtained in an example of subtraction where a larger amount is subtracted from a smaller one as, for instance, in a case of an overdraft at a bank. By the mechanism shown and described herein in order to obtain and print a correct negative total or overdraft it is necessary to operate the machine with the subtraction key lever 63 depressed so as to hold the pinions 27 in mesh with the pinions 24. This, of course, results in the pinions 27 being turned in the direction indicated by the arrow in Fig. 5; whereas when said pinions are operated in addition and are in mesh with the racks 33 said pinions 27 are turned in a direction indicated by the arrow in Fig. 7. When printing a positive total, the trip members 45 stop on the upper sides of the shoulders 44, whereas in printing a negative total the trip cams 45 stop against the lower edges of the shoulders 44. Thus the wheels 27 have a positive zero position and also a negative zero position. To print the negative total it is necessary to do so with the key lever 63 latched down holding the pinions 27 in mesh with the pinions 24. It is also necessary in subtracting to introduce an additional unit into the units denominational pinions 27 and this is performed automatically and as an incident to the operation of the machine. A member 105 (Figs. 9 and 10) is supported by pin in slot arrangement 106 on the same fixed pin as the part 74. A U-shaped lever pivotally supported on the shaft 107 has one arm 108 provided with an operating connection 109 with the slide 105 and the other arm 110 having an operative connection 111 with the sliding link 88. This device controls the release of the rack plate 20 in units denominational order to permit said rack to move an additional unit distance to introduce 1 in the pinions 27 in units denominational order at certain times. The latch 40 for the rack plate 20 in units denominational order has a lateral projection 112 (Fig. 10) over the rear end of an arm 113 of a bell crank lever pivoted on a support 114. The lower arm 115 of the bell crank lever has a stud or roll 116 engaged by a cam shoulder 117 on the slide 105 when the slide is raised or lowered by the raising and lowering of the slide 88. In Fig. 10 the slide 105 is in its raised position. From this it will be seen that when the slide 88 moves up or down—which it does only when shifting from subtraction to addition and vice versa—the latch 40 in units denominational order will be released from the detent 36 controlling the rack plate 20 in units denominational order and will permit a transfer of 1 in units order. When the arm 113 is raised as described, the laterally turned end 113ᵃ thereof becomes engaged upon a shoulder 118ᵃ on a latch member 118 which is actuated in a direction to place the shoulder 118ᵃ under an extension 113ᵃ by a spring 118ᵇ. When the machine is at rest a projection 119 on the arm 60 engages a part 120 on the lower end of the latch member 118 and thereby retains the latch member in position in which the extension 113ᵃ will not engage the shoulder 118ᵃ. At the beginning of the forward movement of the arm 60 the spring 118ᵇ operates to place the shoulder 118ᵃ under the extension 113ᵃ in case the lever 113 is operated. Near the end of the return movement the projection 119 engages the part 120 and operates the latch 118 to release the lever 113.

It will be perceived that the fugitive 1 is added or subtracted as the case may be as a result of the shifting of the bar 88 in changing the machine from a setting for addition to one for subtraction or vice versa. This bar is not shifted directly by the key but is shifted by the operating mechanism so that mere idle manipulation of the key 63 does not affect the mechanism under consideration. In normal adding operations the slide 88 stands in its upper position shown in Fig. 9, and as long as the machine is merely adding it operates like any other adding machine. When, however, a number is to be subtracted the key 63 is depressed resulting in the slide 88 being pulled down and the transfer mechanism being operated to subtract from the units wheel one more than the number set up by the keys. At the end of the subtracting operation the key 63 is automatically released and if the next item is added the bar 88 will be moved to its upper position and the transfer mechanism for the units wheel will, therefore, again be operated and the fugitive 1 which was subtracted out in the subtracting operation will be added back in leaving the machine in the same condition as if no fugitive ones had been added or subtracted. The operation will be best understood by a series of examples.

*Example 1:* Add 200; subtract 50—

```
            200
            −50
            ———
            149
Spacing stroke,  1
            ———
            150
```

When the subtract key was operated after setting up 50 it brought into operation the fugitive 1 mechanism which subtracted 1 in addition to the 50 leaving the wheels standing at 149. At the end of the subtracting operation the key 63 would be automatically released for addition. If, then, the operator gave the usual spacing stroke to the handle the bar 88 would be moved upward due to the change in the setting of the machine and the fugitive 1 would be added in bringing the wheels to indicate 150. This spacing operation of the handle, however, resulted in an operation of the mechanism for inserting the fugitive one and, in some cases of the regular transfer mechanism. It is, therefore, necessary to give another spacing operation to the handle in order to normalize that mechanism before taking the total.

*Example 2:* Add 200; subtract 50, subtract 25—

```
            200
            −50
            ———
            149
             25
            ———
            124
Spacing stroke,  1
            ———
            125
```

In this case, as in the first example, the fugitive 1 was subtracted when subtracting the 50 because at that time the setting of the machine was changed from plus to minus. When, however, we come to subtract the 25 the bar 88 is already at minus and the fugitive 1 will not be subtracted a second time. The wheels will, therefore, indicate 124. In this instance, as in Example 1, it is necessary to give two spacing strokes to the handle before taking the total; the first spacing stroke changing the setting of the bar 88 from minus to plus and adding back the fugitive 1, and the second spacing stroke normalizing the transfer mechanism. In this particular example there was no ordinary transfer but the fugitive one mechanism required to be normalized.

*Example 3:* Add 50; subtract 200—

```
           0050
          −0200
          ——————
           9849
```

When the 50 was added the machine was in condition for addition, and when the 200 was subtracted its setting was changed to subtraction. The machine would, therefore, subtract 201 leaving the wheels standing at 9849, assuming that there are four wheels. This being a negative total it would be printed with the subtract key down. In this position of the parts a 9 would be printed 0, a 4 would be printed 5 and an 8 would be printed 1 so that the wheels would yield the correct negative balance. If the operator happens to be aware that the wheels contain a negative balance he could depress the subtract key, give one spacing stroke to the handle to normalize the transfer mechanism, then depress the subtract key and he could take his total. In this machine, the safe course would be to make it an invariable rule to give two spacing strokes to the handle.

If the operator was not aware that the total was negative he would probably give the usual spacing stroke to the handle and then attempt to operate the total key. As will hereinafter appear he would find the total key locked and he would then have to depress the subtract key and hold the subtract key down, giving two spacing strokes to the handle and then take his total.

In the instance last above mentioned where the operator, being unaware that he had a negative total in the machine, pulled the handle without depressing the subtract key that spacing stroke of the handle would have restored the mechanism to positive and would have added back the fugitive 1. Finding the total key locked would have apprised the operator that he had a negative total in the machine. He would then depress the subtract key, giving another spacing stroke to the handle, which would again set the machine for subtraction and again subtract out the fugitive 1. He must then give another spacing stroke to the handle, with the subtract key depressed, to normalize the transfer mechanism, after which he could depress the total key still holding the subtract key down and take his total, which would print a negative 150.

It may be remarked that if, after Example 3 above, 125 were to be subtracted, the wheels would stand at 9724, and the transfer mechanism would all be at normal because that particular subtraction did not involve any transfer. The operator could, therefore, take his negative total at once, without any spacing strokes, and the machine would print the correct answer, viz., 275 (negative).

From the above explanation it will be seen that the fugitive 1 is added at every operation of the handle which changes the setting of the machine from negative to positive and the fugitive 1 will be subtracted at every operation of the handle which changes the setting of the machine from positive to negative. The only difference in the mode of operating this machine from other machines is that before taking a total it is necessary to give two idle strokes to the handle instead of one; and even this necessity is in many instances due only to the operator's ignorance of or inattention to the condition of the mechanism at the time. In instances where the last computing operation is of the same sign as the resulting total, only one spacing stroke is required; and if the last two operations are of the same sign as the total and the last operation did not involve any transfer of tens, no spacing stroke at all is necessitated by the mechanism.

Figures 11, 13:
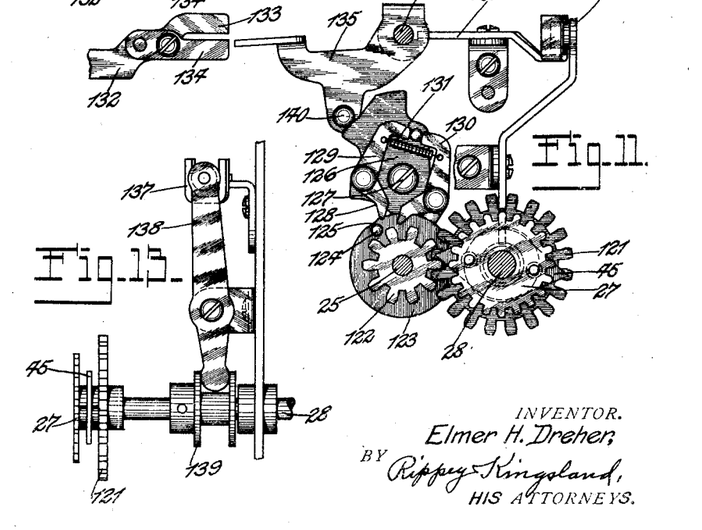
Fig. 11 is a side elevation of the devices in the calculating mechanism for compelling the printing of a positive total when the accumulation is positive and the printing of a negative total when the accumulation is an overdraft.
Fig. 13 is a rear elevation of parts shown in Fig. 11.

The pinion 27 in highest denominational order has a gear 121 attached thereto and meshing with a pinion 122 loose on the shaft 25 (Fig. 11). A disc 123 rotates with the pinion 122 and has a pin 124 at one side thereof adjacent to a notch 125 in the periphery of the disc. The plate 126 is supported on a pivot 127 above the disc 123 and has a pair of concave notches 128 in its lower edge fitting alternately upon the periphery of the disc 123. The disc 123 and the plate 126 constitute a species of Geneva movement—one complete turn of the disc 123 being required to shift the plate 126 from one position to another. A pair of pawls 129 and 130 are pivotally supported by the plate 126 and are connected and actuated toward each other above their pivots by a spring 131. The usual link 132 is operated by the total key 14 when taking a total or result from any of the calculating mechanisms and has attached to opposite sides of its rear end an upper finger 133 and a lower finger 134. The two fingers 133 and 134 are in different vertical and horizontal planes in alinement with the different vertical and horizontal planes occupied by the lever 135 during different stages in the variation thereof in the performance of examples of addition and subtraction. As presently described said fingers 133 and 134 will prevent operation of the total key 14 until the lever 135 is moved to a position in which it is out of alinement with both of the fingers 133 and 134. A locking member 135 is mounted for lateral sliding and up and down swinging movement on a support 136 and is thus movable to four different positions. Said member is slid right and left in unison with the shaft 28, occupying a left-hand position, shown in Fig. 12, when said shaft is set for addition and a right-hand position when the shaft is set for subtraction. The front end of said member occupies its lower position, shown in Fig. 11, when the wheels register a positive total, and is swung to its upper position when the wheels register a negative total. In its upper left-hand position, which it occupies when the machine registers a negative total but is set for addition, it stands behind the finger 133 and prevents operation of the total key. When, then, the operator depresses the subtract key and gives the machine a spacing stroke, the finger is moved with the shaft 28 to the right, where it is to the right of the finger 133 and above the finger 134, and the total key is, therefore, unlocked. When the machine registers a positive total, but is set for subtraction, the locking member is in its lower right-hand position and blocks finger 134 and prevents operation of the total key. A spacing stroke with the subtract key up, will move member 135 to its lower left-hand position by setting shaft 28 for addition, and thus free the total key. This device, therefore, prevents operation of the total key except when the add and subtract mechanism is set for an operation of the same sign as the total registered on the wheels. A lever 137 pivotally supported intermediate of its ends has its forward end operatively engaging the locking member 135 and its rear end engaged by the upper end of a lever 138. The lever 138 is pivoted intermediate of its ends and the end thereof below the pivot engages a grooved member 139 fast on the shaft 28. This linkage transmits the right and left movements of shaft 28 to the locking member 137. The vertical position of said member 137 is controlled by the disk 126. A roller 140 at the side of the member 135 operates upon the cam-like upper edge of the plate 126. When the wheels register a positive total the cam plate 126 is in the position shown (Fig. 11) and the roller 140 is on the lower part of the cam, but when in a subtracting operation the highest wheel turns from 9 to 0, as it does if the subtrahend exceeds the minuend and the pin 124 strikes the lower end of the pawl 130 the cam plate 126 is moved to place the higher part of the cam under the roller 140 and thereby raise the locking member 135 into the level of the upper finger 133.

The locking of the total key lever 14 against operation when a negative total is in the machine constitutes a signal to the operator to the effect that the machine contains a negative total and that the key lever 63 should be operated to print the result and to clear the machine.

When taking a total or subtotal it is necessary to hold the pinions 27 in mesh with the racks 33, and in mesh with the pinions 24 when printing a negative total. A latch 141 (Fig. 14) engages at certain times a lug 142 on a link 143. The link 143 is vertically movable and when in its upper position the lug 142 engages the latch 141 which in turn engages a projection 144 on one of the frame members 29 thereby holding the pinions 27 in mesh with the pinions 24 or the racks 33 as the case may be.

In taking a subtotal the latch 141 holds the pinions 27 in mesh during both the forward and return strokes; but when printing a total to clear the machine the pinions 27 are disengaged from their actuators at the beginning of the return stroke before the pinions 27 have been rotated from clear position. This is accomplished by downward movement of the link 143 which has a cam 145 contacting with the projection 144 and swinging the supporting frame to disengage the pinions 27 from their actuators. The mechanism for imparting vertical movement to the link 143 is not claimed as a part of the present invention and is therefore not shown or described, and it is sufficient for present purposes to understand that downward movement is imparted to said link at the beginning of the return stroke and before the pinions 27 have been turned by their actuators from clear position. The mechanism for operating the link 143 comprises a part of the subject matter of Walter W. Landsiedel application Serial No. 686,023, (patent No. 1,649,478) previously mentioned.

In taking a total or subtotal it is also necessary to prevent release of the latches 40 from the fingers 42 on the detents 36. A rocking latch 146 (Fig. 16) is operatively connected with a vertically movable link 147 by a bell crank lever 148 on a support 149 having one arm operatively connected with the link 147 and the other arm operatively connected with one end of the link 150 the opposite end of which link is operatively connected with the rocking latch 146. Obviously upward movement of the link 147 will move the rocking latch 146 under the tails of the latches 40 and prevent said latches 40 from becoming disengaged from the fingers 42 on the detents 36. This is because the latch 146 when under the tails of the latches 40 prevents tripping of said latches by the trip cams 45 when said cams contact with the wedge shaped extremities 44. The lower end of the link 147 is operatively connected with one arm of a bell crank lever 151 (Fig. 17) pivotally supported at 152 and is actuated upwardly by a spring 153. When the machine is at rest the roll 59 by engagement with the lower arm of the bell crank lever 151 holds the link 147 down against the tension of the spring 153. A latch 154 engages and prevents upward movement of the link 147 at all times other than when a total or subtotal is being listed. When the total key 14 or the subtotal key 15 is operated the latch 154 is released permitting upward movement of the link 147 as described.

When this machine is used in operations involving changes from addition to subtraction and requiring subtraction of a subtrahend which is less than the minuend the machine is conditioned for such operation either by depression of the key 63 to operate the lever 72 and the connections operated by said lever 72, or by shifting the paper carriage to a columnar position in which one of the cams 99 will operate the slide 100 and thereby the lever 72 and the connections operated by said lever 72. This depression of the key 63 or this shifting of the paper carriage may be performed either before or after the subtrahend is set up in the differential carriage 1 but before beginning forward turning movement of the shaft 12. The subtrahend having been set up in the differential carriage and the lever 72 and its connections having been operated either by depression of the key 63, or by shifting the paper carriage, the counting pinions 27 are shifted from alinement with the racks 33 to alinement with the pinions 24. During forward turning movement of the shaft 12 in this work the counting pinions 27 are out of engagement with the pinions 24 and are not rotated. Before the pinions 24 begin to rotate on return turning movement of the shaft 12 the pinions 27 are meshed with the pinions 24 and rotated thereby. That is to say, such of the pinions 24 as correspond to the denominational orders of the digits of the subtrahend are rotated as described and thereby rotate the pinions 27 in a reverse direction from the direction in which said pinions 27 were rotated during straight addition. This reverse rotation of the pinions 27 locates the cams 45 in a relationship to the parts 44 properly to represent the number which is the difference between the minuend and the subtrahend except that the fugitive one has also been subtracted. Then after having performed a spacing stroke of the machine during which the fugitive one is added, and then performing a second spacing stroke to clear the transfer mechanism, the amount remaining in the pinions 27 which is the difference between the subtrahend and the minuend may be printed as a total or sub-total, as desired, by setting the total key 14 or the sub-total key 15 and operating the machine in the usual way. Or another subtrahend may be subtracted from the number remaining in the pinions 27 by operating the machine as above described. Or other items may be added to the amount remaining in the pinions 27. That is to say, the operations of addition and subtraction may be successively performed.

The invention is capable of wide variation in construction and relationship of parts without departure from the nature and principle thereof. I do not restrict myself unessentially in the foregoing or other particulars, but contemplate such alterations and modifications within the scope of the appended claims as may be found advisable.

I claim:—

1. A calculating machine comprising two sets of reciprocating racks, a series of slides for operating said racks, latches controlling movement of said racks relative to said slides, a set of pinions in permanent mesh with one set of racks, a set of calculating pinions, and mechanism for moving said calculating pinions from engagement with said racks to engagement with said first named pinions.

2. A calculating machine comprising type carriers operating on a forward and return stroke, a set of calculating pinions, two separate sets of actuators for said pinions, means for operating said actuators by said type carriers, mechanism for shifting said pinions from one set of actuators to the other for operation on the return stroke, and means whereby one of said sets of actuators will control transfer between said calculating pinions irrespective of the position of said pinions.

3. A calculating machine comprising calculating pinions, a movable plate for each calculating pinion, actuating pinions operated by said plates, a rack in connection with each of said plates at the side of said actuating pinions, means for placing the calculating pinions in engagement with the actuating pinions or with said racks as desired, and a transfer trip cam in connection with each of said calculating pinions and being on the side of said racks opposite from said calculating pinions when said calculating pinions are in mesh with said actuating pinions.

4. A calculating machine comprising calculating pinions, a movable plate for each calculating pinion, actuating pinions operated by said plates, a rack in connection with each of said plates at the side of said actuating pinions, means for placing the calculating pinions in engagement with the actuating pinions or with said racks as desired, a transfer trip cam in connection with each of said calculating pinions and being on the opposite side of said racks from said calculating pinions when said calculating pinions are in mesh with said actuating pinions, a detent device limiting movement of each of said plates, and releasable elements controlled by said trip cams whether said calculating pinions be in engagement with said racks or with said actuating pinions.

5. A calculating machine comprising pivoted elements, differential mechanism limiting movement of said elements in one direction, racks pivotally supported by said pivoted elements, actuating pinions rotative by said racks, calculating pinions, and means for engaging said calculating pinions with said actuating pinions or with said racks, as desired, for operation during movement of said racks to their starting positions.

6. A calculating machine comprising reciprocating elements, differential mechanism limiting movement of said elements in one direction, racks supported by said reciprocating elements, actuating pinions rotative by said reciprocating elements, calculating pinions, means for engaging said calculating pinions with said actuating pinions or with said racks, as desired, for operation during movement of said reciprocating elements to their starting positions, and mechanism controlled by said calculating pinions controlling transfer operations of said racks with respect to said reciprocating elements whether said calculating pinions be operated by said racks or by said actuating pinions.

7. A calculating machine comprising a series of calculating pinions, a series of actuators corresponding to said pinions, a series of racks means for supporting said racks on said actuators for movement by said actuators and transfer movements independently of said actuators, a series of actuating pinions meshing with said racks, an additional series of racks in lateral alinement with said actuating pinions, mechanism for operating said actuators from and to a starting position, detents for stopping said racks in their starting positions, springs for moving said detents to position to permit said racks to operate in transferring operations, means for operating said racks in transferring operations, elements holding said detents in position to prevent transfer operation of said racks, mechanism for moving said calculating pinions from engagement with said second racks to engagement with said actuating pinions for operation by said racks or said actuating pinions during return movement of said racks to their starting position, and parts controlled by said calculating pinions whether in engagement with said racks or said actuating pinions releasing said elements to permit movement of said detents to position to permit transfer movement of said racks.

8. A calculating machine comprising calculating pinions, separate sets of actuators for said calculating pinions, one of said sets of actuators being adapted for clearing said pinions from a positive total and the other set from a negative total, mechanism for shifting said calculating pinions from one set of actuators to the other, a total key device controlling operation of said calculating pinions by said sets of actuators in clearing operations, and mechanism preventing the operation of said total key device to clear said calculating pinions by the adding actuators in case of a negative total and by the subtracting actuators in case of a positive total.

9. A calculating machine comprising a series of calculating pinions, a set of actuators for actuating said calculating pinions in adding operations, a set of actuators for operating said calculating pinions in subtracting operations, means for shifting said pinions from one set of actuators to the other, a total key device controlling operation of said calculating pinions by either set of actuators in clearing operations, and means preventing a clearing operation of said calculating pinions by the adding actuators in case of a negative total and by the subtracting actuators in case of a positive total.

10. A calculating machine comprising a series of calculating pinions, a set of actuators for actuating said calculating pinions in adding operations, a set of actuators for actuating said calculating pinions in subtracting operations, means for shifting said pinions from one set of actuators to the other, means utilizing a movement of the corresponding set of actuators to operate the calculating pinions in transferring operations, mechanism for operating said actuators to operate the calculating pinions in clearing operations, and mechanism for preventing a clearing operation of said calculating pinions by the adding actuators in case of a negative total and by the subtracting actuators in case of a positive total.

11. A calculating machine comprising a series of calculating pinions, two series of actuators for actuating said pinions in different calculations, mechanism for shifting said calculating pinions from one set of actuators to the other, automatic mechanism for transferring a unit to the units denominational calculating pinion when changing from one kind of calculation to the other, mechanism for operating said calculating pinions in clearing operations, and means for preventing clearing of said calculating pinions by one set of actuators in case said pinions register one kind of total and by the other set of actuators in case said pinions register another kind of total.

12. A calculating machine comprising elements operative on a forward and a return stroke, a series of plates arranged in denominational orders operated by said elements, means for supporting said plates for sliding movement relative to said elements, two sets of racks rigid with said plates, a shaft extending transversely between the two sets of racks, a series of pinions rotative on said shaft and meshing with one set of said racks and having their peripheries in alinement with the other set of racks, and a series of calculating pinions engageable optionally with said other set of racks or with said pinions.

13. A calculating machine comprising elements operative on a forward and a return stroke, a series of plates arranged in denominational orders operated by said elements, means for supporting said plates for sliding movement relative to said elements, two sets of racks rigid with said plates, a shaft extending transversely between the two sets of racks, a series of pinions rotative on said shaft and meshing with one set of said racks and having their peripheries in alinement with the other set of racks, a series of calculating pinions engageable optionally with said other set of racks or with said pinions, mechanism controlling transfer operations of said plates, and means operated by said calculating pinions controlling said mechanism.

14. A calculating machine comprising a series of plates arranged in denominational orders, a series of movable supports, means for supporting said plates for sliding movements with and relative to said supports, two sets of racks of equal effective length rigid with said plates, a shaft extending transversely between said sets of racks, a series of pinions on said shaft meshing with one set of racks and extending to the same plane of the other set of racks, a series of calculating pinions, mechanism for shifting said calculating pinions laterally to engage said first named pinions or said second set of racks as desired, latches controlling transfer movement of said plates, and means controlled by said calculating pinions controlling said latches to permit transfer movements of said plates.

15. A calculating machine comprising calculating pinions, a series of slides, a set of longitudinally movable actuators for said pinions, means for supporting said actuators on said slides for movement thereby and for movements independently thereof, a set of rotary actuators for said pinions in permanent engagement with said first named actuators and operated thereby, and mechanism for moving said pinions out of and into engagement with said two sets of actuators selectively.

16. A calculating machine comprising calculating pinions, a series of slides, a set of longitudinally movable actuators for said pinions, means for supporting said actuators on said slides for movement thereby and for movements independently thereof, a set of rotary actuators for said pinions in permanent engagement with said first named actuators and operated thereby, mechanism for moving said pinions out of and into engagement with said two sets of actuators selectively, latches holding said first named actuators from transfer movements, and means controlled by said pinions for releasing said latches irrespective of which set of actuators are engaged by said pinions.

17. A calculating machine comprising a set of longitudinally movable actuators, a series of longitudinally movable slides, means for supporting said actuators on said slides for movement thereby and for movements independently thereof, a set of rotary actuators in permanent engagement with said first named actuators, a set of calculating pinions, mechanism for shifting said pinions out of engagement with either set of actuators and into engagement with the other set, and means controlled by said pinions for operating the first set of actuators and thereby the rotary actuators to operate said pinions in transfer operations.

18. A calculating machine comprising two series of racks of equal effective length, each rack of one series being rigid with a corresponding rack of the other series, slides for supporting said racks, latches controlling movement of said racks relative to said slides, pinions meshing with the racks of one series and extending to the plane of the racks of the other series, calculating pinions, and means for shifting said calculating pinions laterally to positions for engagement with said first named pinions or with said second series of racks as desired.

19. A calculating machine comprising two series of racks of equal effective length, each rack of one series being rigid with a corresponding rack of the other series, slides for supporting said racks, latches controlling movement of said racks relative to said slides, pinions meshing with the racks of one series and extending to the plane of the racks of the other series, calculating pinions, means for shifting said calculating pinions laterally to positions for engagement with said first named pinions or with said second series of racks as desired, and mechanism under control of said calculating pinions controlling transfer operations of said racks.

20. In a calculating machine, two series of racks of equal effective length, a series of supports for said racks, mechanism for actuating said supports to operate said racks in all operations other than transfer operations, a series of pinions meshing with one series of racks and having their peripheries in the plane of the other series of racks, a series of calculating pinions of the same diameter as said first named pinions, means for shifting said calculating pinions to positions for engagement with said first named pinions or said second series of racks as desired, means for moving said calculating pinions into and out of engagement with said first named pinions and said second series of racks when said calculating pinions are in position for such engagement, latches engaging and holding said racks in one adjustment on said supports, and means under control of said calculating pinions for releasing said latches to permit transfer movements of said racks while said supports remain stationary.

21. In a calculating machine comprising a series of reciprocating elements, reciprocating supports for supporting and reciprocating said elements, a rack rigid with each of said elements, a series of pinions supported at the sides of said racks and in lateral alinement therewith, means for operating said pinions by said elements, a series of calculating pinions, means for moving said calculating pinions laterally into alinement with said racks or said first named pinions as desired and mechanism operated by said calculating pinions controlling transfer operation of said reciprocating elements with respect to said supports.

22. In a calculating machine comprising a series of reciprocating elements, reciprocating supports for supporting and reciprocating said elements, a rack rigid with each of said elements, a series of pinions supported at the sides of said racks and in lateral alinement therewith, means for operating said pinions by said actuators, a series of calculating pinions, means for moving said calculating pinions laterally into alinement with said racks or said first named pinions as desired, and means for operating said elements with respect to said supports to cause said racks or said first named pinions to operate said calculating pinions in transfer operations.

23. In a calculating machine, a series of reciprocating plates having longitudinal slots, a longitudinally movable slide for supporting and operating each of said plates, a shaft extending through said slots, a series of pinions on said shaft between said plates, a rack on each plate in permanent mesh with the corresponding pinions, another rack on each plate in lateral alinement with peripheral portions of said pinions, a series of calculating pinions, means for shifting said calculating pinions to position for engagement with said first named pinions or said second racks as desired, and means controlled by said calculating pinions controlling transfer operations of said plates with respect to said slides to operate said first named pinions and said second racks and thereby said calculating pinions in transferring.

24. In a calculating machine, a series of pivoted elements, a series of slides supported and operated by said elements, a series of plates supported by said slides, a series of racks rigid with said plates, a series of pinions supported between said plates in mesh with said racks, an additional series of racks rigid with said plates in lateral alinement with the peripheries of said pinions, a series of calculating pinions, a shaft on which said pinions are supported, and mechanism for shifting said shaft laterally to position said calculating pinions for operation by said first named pinions or said second series of racks as desired.

25. In a calculating machine, a series of pivoted elements, a series of slides supported and operated by said elements, a series of plates supported by said slides, a series of racks rigid with said plates, a series of pinions supported between said plates in mesh with said racks, an additional series of racks rigid with said plates in lateral alinement with the peripheries of said pinions, a series of calculating pinions, a shaft on which said calculating pinions are supported, mechanism for shifting said shaft laterally to position said calculating pinions for operation by said first named pinions or said second series of racks as desired, and devices controlled by said calculating pinions controlling transfer operations of said plates.

26. A calculating machine, comprising a series of pivoted elements, a series of slides pivotally supported and operated by said elements, a series of plates supported and operated by said slides, a series of pinions in permanent engagement with said plates, a series of racks on said plates at the sides of said pinions, a series of calculating pinions, means for positioning said calculating pinions for operation by said first named pinions or said racks as desired, latches engaging said plates, elements controlled by said calculating pinions for releasing said latches, and means for operating said plates in transfer movements when said latches are released.

27. A calculating machine, comprising a series of calculating pinions, two series of actuators for actuating said pinions during movement of said actuators to a starting position, means for shifting said pinions from one of said series of actuators to the other, mechanism for operating said actuators to clear said calculating pinions, one of said series of actuators being adapted for clearing said pinions from a positive total and the other series from a negative total, and means preventing a clearing operation of said calculating pinions by one of said sets of actuators in case of a positive total and by the other set of actuators in case of a negative total.

28. A calculating machine comprising a series of calculating pinions, two series of actuators for actuating said pinions during movement of said actuators to a starting position, means for shifting said pinions from one of said series of actuators to the other, mechanism for operating said actuators to clear said calculating pinions, one of said series of actuators being adapted for clearing said pinions from a positive total and the other set from a negative total, means preventing a clearing operation of said calculating pinions by the wrong set of actuators, and automatic mechanism for transferring a unit to the units denominational calculating pinion on occasion in order to introduce the "fugitive one".

29. A calculating machine comprising a series of supports, means for reciprocating said supports longitudinally, two series of racks, means for supporting said racks by said supports for respective transfer movements with respect to the corresponding supports, a series of pinions in permanent engagement with and rotated by one series of said racks, a series of calculating pinions, and means for engaging the calculating pinions with said first named pinions or with the other series of said racks, as desired.

30. A calculating machine comprising a series of reciprocating supports, two series of racks, means for supporting said racks by said supports for respective transfer movements along and with respect to the corresponding supports, a series of pinions in permanent engagement with and rotated by one series of said racks, a series of calculating pinions, means for engaging the calculating pinions with said first named pinions or with the other series of said racks, as desired, and mechanism controlled by said calculating pinions controlling transfer operation of said calculating pinions by said first named pinions and also by said series of racks engageable by said calculating pinions.

31. A calculating machine comprising mechanism operating on a forward and return stroke, two series of racks supported by said operating mechanism for actuating movements thereby and for transfer movements independently thereof, a series of intermediate pinions in permanent engagement with one series of said racks, a series of calculating pinions, means for operating said calculating pinions by said intermediate pinions or by the other series of said racks, as desired, and elements controlled by said calculating pinions controlling said transfer movements of said racks whether said pinions be operated by said intermediate pinions or by said other series of racks.

32. A calculating machine comprising a series of sliding actuators, two series of rigidly united racks, means for supporting said two series of racks on said actuators for operation by said actuators and for transfer movements independently of said actuators, a series of pinions in permanent engagement with one series of said racks, a series of calculating pinions, means for engaging said calculating pinions with said first named pinions or with said second series of racks, as desired, and devices controlled by said calculating pinions controlling said transfer movements of said racks independently of said actuators.

33. A calculating machine comprising a series of sliding actuators, a series of racks supported for operation by and independent transfer movements along said actuators, a series of additional racks rigidly united with said first named racks, a series of pinions in permanent engagement with said first named racks, a series of calculating pinions, means for operating said calculating pinions by said first named pinions or by said additional series of racks, as desired, and mechanism controlled by said calculating pinions for controlling said transfer movements of said first named racks along said actuators whether said calculating pinions be operated by said first named pinions or by said additional racks.

34. A calculating machine comprising a series of longitudinally movable slides, a series of plates, means for supporting said plates on said slides for operation by said slides and for transfer movements independently of said slides, two racks supported by each plate, an intermediate pinion operated by one of said racks on each plate, said pinions having their peripheries in alinement with the other racks on said plate, a set of calculating pinions, mechanism for engaging said calculating pinions with said first named pinions or with the racks alined with the peripheries of said first named pinions, as desired, and transfer latches for said plates controlled by said calculating pinions.

35. A calculating machine comprising a series of slides, a series of actuators supported by said slides for movement thereby and for transfer movements independently thereof, a separate set of actuators operated by said first named actuators, a set of calculating pinions, means for engaging said calculating pinions with either set of actuators and as an incident thereto disengaging said calculating pinions from the other set of actuators, and mechanism controlling operation of one set of actuators to effect transfer from lower to higher denominational orders in said calculating pinions when said calculating pinions engage said set of actuators.

36. A calculating machine comprising a series of slides, a series of actuators supported by said slides for movement thereby and for transfer movements independently thereof, a separate set of actuators operated by said first named actuators, a set of calculating pinions, means for engaging said calculating pinions with either set of actuators and as an incident thereto disengaging said calculating pinions from the other set of actuators, and mechanism controlling operation of one set of actuators to effect transfer from lower to higher denominational orders in said calculating pinions when said calculating pinions engage said set of actuators and also when said calculating pinions engage the other set of actuators.

37. In a calculating machine, a calculating mechanism comprising a slide, a pair of rigidly connected racks, means supporting said racks on said slide for movement by said slide and for transfer movement independently of said slide, a latch controlling transfer movement of said slide, a pinion operated by one of said racks, a calculating pinion, and means for meshing said calculating pinion with said first pinion or with said other rack, as desired.

38. In a calculating machine, calculating mechanism comprising two series of racks, a series of slides, means for supporting said racks on said slides for movement by said slides and transfer movements independently of said slides, latches controlling transfer movements of said racks, a series of pinions meshing with one series of racks, a series of calculating pinions, and means for engaging said calculating pinions with the other series of racks or with said first pinions, as desired.

39. In a calculating machine, calculating mechanism comprising two series of racks, a series of slides, means for supporting said racks on said slides for movement by said slides and transfer movements independently of said slides, a series of pinions meshing with one series of racks, a series of calculating pinions, means for engaging said calculating pinions with the other series of racks or with said first pinions, as desired, and means controlled by said calculating pinions controlling said transfer movements of said racks independently of said slides.

40. A calculating machine comprising a series of longitudinally movable slides, means for guiding said slides in their longitudinal movements, a plate mounted for relative sliding movements on each of said slides, a spring for actuating each plate relative to the slide on which it is mounted, a pair of racks supported by each plate, a pinion in permanent mesh with one rack on each plate, a series of calculating pinions, means for shifting said calculating pinions into engagement with said first named pinions or with the other racks on said plates, as desired, and devices controlled by said calculating pinions controlling movement of said plates relative to said slides.

41. In a calculating machine, a shaft, a series of calculating pinions independently rotative upon said shaft, two series of actuators arranged side by side for actuating said pinions in calculating and transferring operations, a disc on one end of said shaft, a bifurcated lever engaging said disc for shifting said shaft longitudinally to move said calculating pinions to operative position with respect to either series of said actuators, a slide having an angular slot, a projection on said lever engaging in said slot, and means for moving said slide to operate said lever and thereby shift said shaft and said calculating pinions.

42. A calculating machine comprising separate sets of actuators, means for operating one set of actuators by the other, a set of calculating pinions, a detent engaging and limiting extent of movement of said other set of actuators, mechanism for engaging said calculating pinions with either set of actuators and as an incident thereto disengaging said calculating pinions from the other set of actuators, as desired, and a member controlled by each calculating pinion controlling release of the corresponding detent irrespective of which set of actuators engage said calculating pinions.

43. A calculating machine comprising separate sets of actuators, means for operating one set of actuators by the other, a set of calculating pinions, mechanism for engaging said calculating pinions with either set of actuators and as an incident thereto disengaging said calculating pinions from the other set of actuators, as desired, and mechanism controlling operation of said other set of actuators to effect transfer from lower to higher denominational orders in said calculating pinions irrespective of which set of said actuators are engaged by said calculating pinions.

44. In a calculating machine, a series of slides, a series of plates each having a longitudinal slot therein, means for supporting said plates on said slides for operation by said slides and for transfer movements independently of said slides, a rack supported by each plate, a shaft extending through said slots in said plates, pinions on said shaft operated by said racks, elements pivoted on said shaft controlling transfer movements of the corresponding plates, latches for said elements, calculating pinions operated by said first named pinions, and means operated by said calculating pinions for tripping said latches to permit release of said elements from said plates.

45. A calculating machine comprising a series of longitudinally movable actuator plates having slots therein, means for supporting and operating said plates by said actuators two racks formed on each of said plates, a shaft extending through said slots in said plates, pinions on said shaft each of which meshes with a rack on a corresponding one of said plates, detents pivoted on said shaft controlling transfer movements of said plates along said actuators, latches for holding said detents in position to prevent transfer movements of said plates, a series of calculating pinions, mechanism for engaging said calculating pinions with said first named pinions or with the other racks on said plates, as desired, and means operated by said calculating pinions for releasing said latches from said detents.

46. A calculating machine comprising a series of longitudinally movable slides, a series of slotted plates, means for supporting said plates on said slides for operation by said slides and for transfer movements independently of said slides, two racks supported by each plate, a shaft extending through the slots in said plates, an intermediate pinion operated by one of said racks on each plate and having its periphery in alinement with the other rack on said plate, detents pivoted on said shaft controlling transfer movements of said plates, latches for holding said detents in position to prevent transfer movements of said plates, calculating pinions optionally engageable with said first named pinions or with the racks alined with the peripheries of said first named pinions, as desired, and means operated by said calculating pinions for releasing said latches from said detents when said calculating pinions are operated by corresponding racks.

47. A calculating machine comprising a series of longitudinally movable slides, a series of slotted plates, means for supporting said plates on said slides for operation by said slides and for transfer movements independently of said slides, two racks supported by each plate, a shaft extending through the slots in said plates, an intermediate pinion operated by one of said racks on each plate and having its periphery in alinement with the other rack on said plate, detents pivoted on said shaft controlling transfer movements of said plates, latches for holding said detents in position to prevent transfer movements of said plates, calculating pinions optionally engageable with said first named pinions or with the racks alined with the peripheries of said first named pinions, as desired, and means operated by said calculating pinions for releasing said latches from said detents when said calculating pinions are operated by said intermediate pinions.

48. A calculating machine comprising a series of longitudinally movable slides, a series of slotted plates, means for supporting said plates on said slides for operation by said slides and for transfer movements independently of said slides, two racks supported by each plate, a shaft extending through the slots in said plates, an intermediate pinion operated by one of said racks on each plate and having its periphery in alinement with the other rack on said plate, detents pivoted on said shaft controlling transfer movements of said plates, latches for holding said detents in position to prevent transfer movements of said plates, calculating pinions optionally engageable with said first named pinions or with the racks alined with the peripheries of said first named pinions, as desired, and means operated by said calculating pinions for releasing said latches from said detents both said calculating pinions are operated by said intermediate pinions and by the corresponding racks.

49. A calculating machine comprising a series of longitudinally movable supports, a plate mounted for sliding movements on and operation by each of said supports, two racks rigid with each of said plates, a series of pinions for said series of plates, each of which pinions is in permanent engagement with one of the racks of a corresponding plate and has its periphery in the plane of the other rack, a detent controlling sliding movements of each of said plates on the corresponding support, a series of calculating pinions, means for shifting said calculating pinions selectively to engage said first named pinions or the racks which are in alinement with said first named pinions, and means for tripping said detent to permit sliding movements of said plates in either of said positions of said calculating pinions.

50. A calculating machine comprising a series of longitudinally movable supports, a plate mounted for sliding movements on and for operation by each of said supports, two racks rigid with each of said plates, a series of pinions, one of which is in permanent engagement with one of the racks of a corresponding plate and has its periphery in the plane of the other rack, a detent holding each of said plates from sliding transfer movements on the corresponding support, a series of calculating pinions engageable optionally with said first named pinions or with the racks which are in the plane of the peripheries of said first named pinions, and mechanism for tripping said detents by said calculating pinions irrespective of whether said calculating pinions mesh with said first named pinions or with said racks.

51. A calculating machine comprising a plurality of counting pinions, a plurality of plates, a pinion operated by each of said plates for operating a corresponding one of said counting pinions in examples of subtraction, a rack operated by each of said plates for operating the corresponding counting pinion in examples of addition, a total key device, means for preventing operation of said total key device after certain operations of said counting pinions by said first named pinions, and mechanism for causing said means to move to position to permit operation of said total key mechanism.

52. A calculating and recording machine comprising a series of calculating pinions rotatable in either of two lateral positions, two series of elements for rotating said pinions to introduce numbers therein, depressible keys for controlling both series of said elements, means for engaging said pinions with one series of said elements in one of the lateral positions of said calculating pinions and with the other series of said elements in the other lateral position of said pinions, a device for controlling transfer operation of one of said elements for units pinions, and a series of recording devices for recording the numbers introduced into said pinions by either of said series of elements aforesaid.

53. The combination in a calculating and recording machine operable to add, subtract and record numbers and to print the algebraic totals thereof and having a series of trains of mechanism arranged in denominational orders, each of said trains including a reciprocating rack member, a pinion, a tripping member operated by the pinion, and a latch member; of an oscillating member having a positive and a negative position; an element for moving said oscillating member from one of its positions to the other; and a special tripping member cooperating with said oscillating member and operable as an incident to the movement thereof to trip the latch member of lowest denominational order.

54. A calculating machine comprising a plurality of laterally shiftable counting pinions arranged in denominational orders and rotatable in either of two lateral positions, separate sets of laterally alined actuators for operating said pinions in the different lateral positions of said pinions to obtain positive totals in addition in one lateral position of said pinions and negative totals in subtraction in another lateral position of said pinions, clearing mechanism, and a device for preventing operation of said clearing mechanism and indicating the presence of a negative total when a negative total is initially obtained and represented by said pinions.

55. The combination of a set of denominational register wheels; two sets of toothed actuators for said wheels, one set for turning said wheels in one direction for addition and the other set for turning said wheels in the opposite direction for subtraction, said set of register wheels being shiftable bodily to two active positions in one of which the wheels mesh with the actuators of one set and in the other of which they mesh with the actuators of the other set; means for imparting to actuators of both sets differential forward strokes and return strokes to normal position; means for engaging said register wheels with the actuators of the first set of actuators for the return strokes of the latter to add a number and with the actuators of the second set of actuators for the return strokes of the latter to subtract a number; means for imparting on occasion a step of movement beyond normal to that actuator of a denomination above the lowest which is at the time engaged by its register wheel, in order to transfer; and means that act on occasion to impart a step of movement beyond normal to that actuator of lowest order with which the wheel of lowest order is engaged at the time, in order to insert the fugitive one.

56. The combination of a set of denominational register wheels having lugs; two sets of toothed actuators for said wheels, one set for turning said wheels in one direction for addition and the other set for turning said wheels in the opposite direction for subtraction, said set of register wheels being shiftable bodily to two active positions in one of which the wheels mesh with the actuators of one set and in the other of which they mesh with the actuators of the other set; a set of type carriers connected to both of said sets of actuators; means for imparting to actuators of both sets differential forward strokes and return strokes to normal position; means for engaging said register wheels with the actuators of the first set for the return strokes of the latter to add a number and with the actuators of the second set for the return strokes of the latter to subtract a number; means controlled by said lugs for imparting on occasion a step of movement beyond normal to that actuator of a denomination above the lowest which is at the time engaged by its register wheel, in order to transfer; means that act on occasion to impart a step of movement beyond normal to that actuator of lowest order with which the wheel of lowest order is engaged at the time, in order to insert the fugitive one; means for engaging the wheels with the actuators of one of said sets of actuators on the forward stroke to take a positive total, and for engaging the wheels with the actuators of the other set of actuators on the forward stroke to take a negative total, said lug-controlled means arresting said lugs and wheels at zero in case of a positive total and at a position corresponding to positive nine in case of a negative total.

57. The combination in a calculating machine of depressible keys, two series of actuators controlled by the keys and arranged in denominational orders, a series of registering elements having a positive zero position and a negative zero position, said registering elements being identified with the two series of actuators and shiftable optionally from one series of actuators to the other thereby to accumulate numbers either additively or subtractively and to represent the true algebraic sum thereof notwithstanding the said sum may alternately be of a positive or negative character, means whereby in order to insert the fugitive one the actuators in the lowest denominational order will be caused to move the identified registering element a distance corresponding to one unit, clearing means whereby said elements may be set in either of their zero positions, and recording means operable to print the total represented by the registering elements as an incident to the setting of said elements in either zero position.

ELMER H. DREHER.